US012614155B2

(12) United States Patent (10) Patent No.: US 12,614,155 B2
Khosh et al. (45) Date of Patent: Apr. 28, 2026

(54) SYSTEM FOR ENERGY MANAGEMENT IN A WATER TREATMENT PLANT

(71) Applicant: Schneider Electric USA, Inc., Boston, MA (US)

(72) Inventors: Mostafa Parham Khosh, Mesa, AZ (US); Dina Wagdy, Boston, MA (US); Chennan Li, Newark, CA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/884,393

(22) Filed: Sep. 13, 2024

(65) Prior Publication Data

US 2026/0080369 A1 Mar. 19, 2026

(51) Int. Cl.
G06Q 10/20 (2023.01)
G06Q 50/06 (2012.01)

(52) U.S. Cl.
CPC ............ G06Q 10/20 (2013.01); G06Q 50/06 (2013.01)

(58) Field of Classification Search
CPC ............................... G06Q 10/20; G06Q 50/06
See application file for complete search history.

(56) References Cited

U.S. PATENT DOCUMENTS

| | | | |
|---|---|---|---|
| 10,597,308 B2 * | 3/2020 | Ohtsuki | C02F 1/441 |
| 2018/0121889 A1 * | 5/2018 | Subbarayalu Venkitapathi | G06Q 50/06 |
| 2021/0248567 A1 * | 8/2021 | Hatta | G06Q 10/06313 |
| 2022/0033279 A1 * | 2/2022 | Branum | G06Q 20/145 |

* cited by examiner

*Primary Examiner* — Meredith A Long
(74) *Attorney, Agent, or Firm* — Stinson LLP

(57) ABSTRACT

A system for energy management in a water treatment comprises at least one processor coupled to at least one non-transitory computer-readable medium storing a high-level energy optimization machine learned model (HLEOMLM) and a low-level energy optimization machine learned model (LLEOMLM), and a clean-in-place (CIP) system. In general, the processor is configured to obtain input data from an input data source, and constraints data from a constraints data source. The processor executes the HLEOMLM and LLEOMLM to process the input and constraints data to provide as output a long-term mainte-nance schedule that optimizes energy consumption and a current-maintenance schedule that optimizes operating cost for the water treatment plant. The CIP system receives the output from the processor and executes at least one of a CIP maintenance process and MR maintenance process in response to the output.

20 Claims, 7 Drawing Sheets

306

SYSTEM FOR ENERGY MANAGEMENT IN A WATER TREATMENT PLANT

FIELD

The present disclosure generally relates to an energy management system for water treatment plants.

BACKGROUND

Reverse osmosis (RO) is a commonly used water treatment process that involves forcing water through a semipermeable membrane to filter out contaminants from the water. RO may be used in a wide variety of water treatment applications such as water desalination, wherein saltwater is subjected to RO techniques. Although highly productive in consumable water production, RO techniques used in water desalination account for the majority of energy-consumption associated with water desalination, which in turn, is itself a high-energy consuming water treatment approach.

SUMMARY

Aspects of the present disclosure provide a system for water treatment plants that minimizes energy consumption by optimizing maintenance procedures at the water treatment plants.

In one aspect, a system for energy management in a water treatment plant comprises at least one processor. At least one non-transitory computer-readable medium is coupled to the processor. The computer-readable medium stores a high-level energy optimization machine-learned model (HLEOMLM) comprising processor-executable instructions that, when executed by the processor, cause the system to perform operations. The operations comprise obtaining HLEOMLM input data. The HLEOMLM input data comprises plant operating data for the water treatment plant. HLEOMLM constraints data is obtained for the water treatment plant. The HLEOMLM input data and HLEOMLM constraints data are processed to provide as output, a long-term maintenance schedule configured to minimize energy consumption for the water treatment plant during a HLEOMLM optimization period. The long-term maintenance schedule comprises one or more maintenance process performance times and a corresponding predicted energy consumption value calculated for each of the maintenance process performance times. A clean-in-place (CIP) system is configured to execute a CIP maintenance process responsive to the output of the HLEOMLM for maintaining the water treatment plant.

In another aspect, a system for energy management in a water treatment plant comprises at least one processor. At least one non-transitory computer-readable medium is coupled to the processor. The computer-readable medium stores a low-level energy optimization machine-learned model (LLEOMLM) comprising processor-executable instructions that when executed by the processor, cause the system to perform operations. The operations comprise obtaining LLEOMLM input data. The LLEOMLM input data comprises plant operating data for the water treatment plant. LLEOMLM constraints data for the water treatment plant is obtained. The LLEOMLM input data and LLEOMLM constraints data are processed to provide as output, a current maintenance schedule configured to minimize operating cost for the water treatment plant during a LLEOMLM optimization period. The current maintenance schedule comprises one or more maintenance process performance times and a corresponding predicted operating cost value calculated for each of the maintenance process performance times. A clean-in-place (CIP) system is configured to execute a CIP maintenance process responsive to the output of the LLEOMLM for maintaining the water treatment plant.

In another aspect, a computer-implemented method for maintaining a water treatment plant comprises receiving input data. The input data comprises plant operating data for the water treatment plant. Constraints data for the water treatment plant is received. The constraints data indicates at least one or more optimization periods, an energy consumption objective, and a cost objective. A determination whether to execute at least one of a high-level energy optimization machine-learned model (HLEOMLM) and a low-level energy optimization machine-learned model (LLEOMLM) based on at least one of the input data, constraints data, and optimization data is made. At least one of the HLEOMLM and the LLEOMLM are executed in response to the determination. Executing the HLEOMLM comprises processing the input data and constraints data to provide as output, a long-term maintenance schedule configured to minimize energy consumption for the water treatment plant. The long-term maintenance schedule comprises one or more maintenance process performance times and a corresponding predicted energy consumption value calculated for each of the maintenance process performance times. Executing the LLEOMLM comprises processing the input data and constraints data to provide as output, a current maintenance schedule configured to minimize operating cost for the water treatment plant. The current maintenance schedule comprises one or more maintenance process performance times and a corresponding predicted operating cost value calculated for each of the maintenance process performance times. A clean-in-place (CIP) system, executes a CIP maintenance process responsive to the output of at least one of the HLEOMLM and the LLEOMLM for maintaining the water treatment plant.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Reverse osmosis (RO) is a water treatment process commonly performed at water treatment plants to produce consumable water from, for example, seawater. A shortcoming of RO water treatment processes is that they require significant amounts of energy, which resultantly increases consumer and producer costs associated with consumable water production. However, energy consumption associated with RO water treatment processes may be reduced by optimizing the maintenance of equipment used with RO water treatment processes. As will be described in further detail below, the present disclosure pertains to computerized systems and methods for minimizing energy consumption and operating costs for RO water treatment plants by providing a high-level energy optimization machine-learned model (HLEOMLM) and a low-level energy optimization machine-learned model (LLEOMLM) configured to provide both current and long-term maintenance schedules indicating optimal times for executing maintenance processes on equipment involved in the RO water treatment processes. Accordingly, systems and methods in accordance with the present disclosure also maximize the lifespan of the equipment involved in the RO water treatment processes.

Figure 1:
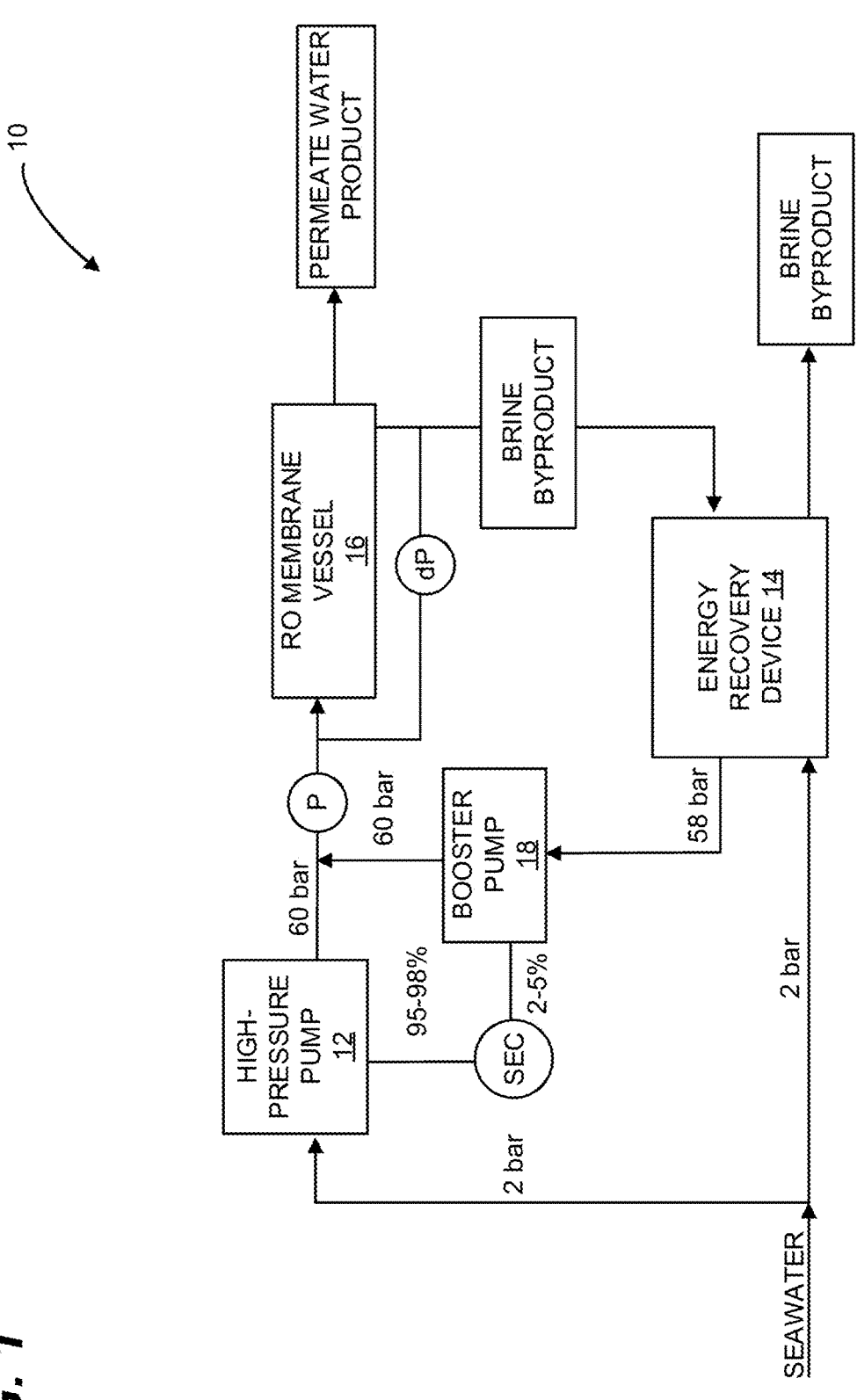
FIG. 1 is a block diagram illustrating a water treatment system for a water treatment plant, according to an embodiment.

Referring now to FIG. 1 an exemplary embodiment of a RO water treatment system for a water treatment plant is generally indicated at reference number 10. In general, the water treatment system 10 utilizes equipment such as filtering membrane elements and pressurizing pumps and devices to remove contaminants from contaminated water to produce consumable water. In the illustrated embodiment, the water treatment system 10 comprises a seawater reverse osmosis skid. The seawater reverse osmosis skid operates by directing seawater into at least one of a high-pressure pump 12 and an energy recovery device 14. The high-pressure pump 12 then feeds the seawater at a high pressure into a RO membrane vessel 16. At the RO membrane vessel 16, contaminants are filtered from the seawater to produce a permeate water product for consumable water production. The contaminants filtered from the permeate water product are consolidated into a brine byproduct. The brine byproduct is fed at a high pressure into the energy recovery device 14, wherein it is used to increase a pressure of incoming seawater. This seawater is then fed into a booster pump 18 that pressurizes the seawater to match a pressure of the seawater being fed from the high-pressure pump 12 into the RO membrane vessel 16. This seawater is then similarly fed into the RO membrane vessel 16 for processing. The brine byproduct from the energy recovery device 14 is safely disposed of.

Pressure (P), differential pressure (dP), and specific energy consumption (SEC) are all metrics capable of being collected and monitored by one or more data collection systems for the water treatment plant 10. Pressure generally indicates an amount of pressure used by the water treatment system 10 to produce one unit of output product (e.g., permeate water product). Differential pressure, on the other hand, is the pressure lost due to friction as water passes through the RO membrane vessel 16. The dP is measured as the pressure difference between input seawater into RO membrane vessel 16 and the brine byproduct pressure. As fouling, scaling, suspended solids, and biological growth can disrupt flow and elevate friction, dP is traditionally used to indicate when membrane maintenance activities such as clean-in-place (CIP), are necessary.

Figure 2A:
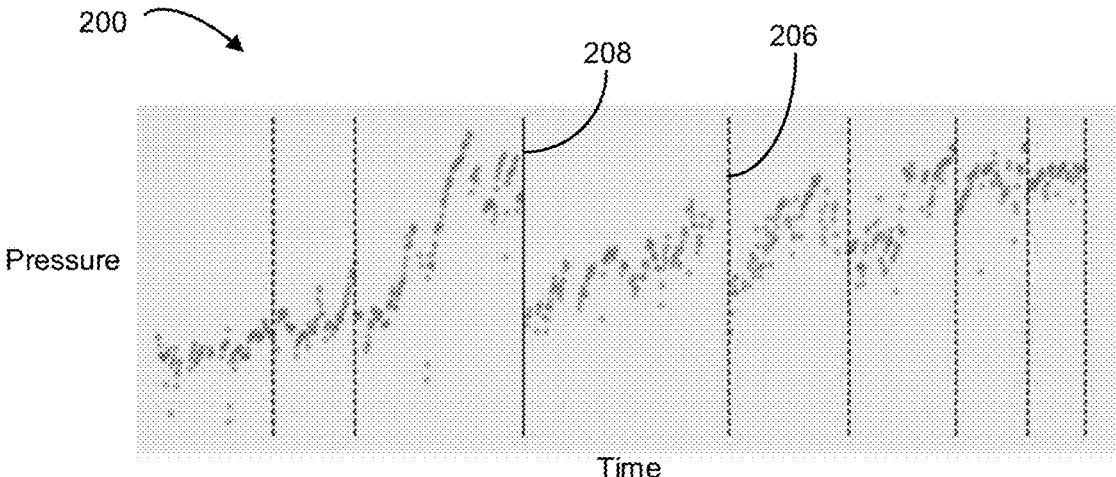
FIG. 2A is a graph illustrating exemplary pressure data for a water treatment plant, according to an embodiment.
Figure 2B:
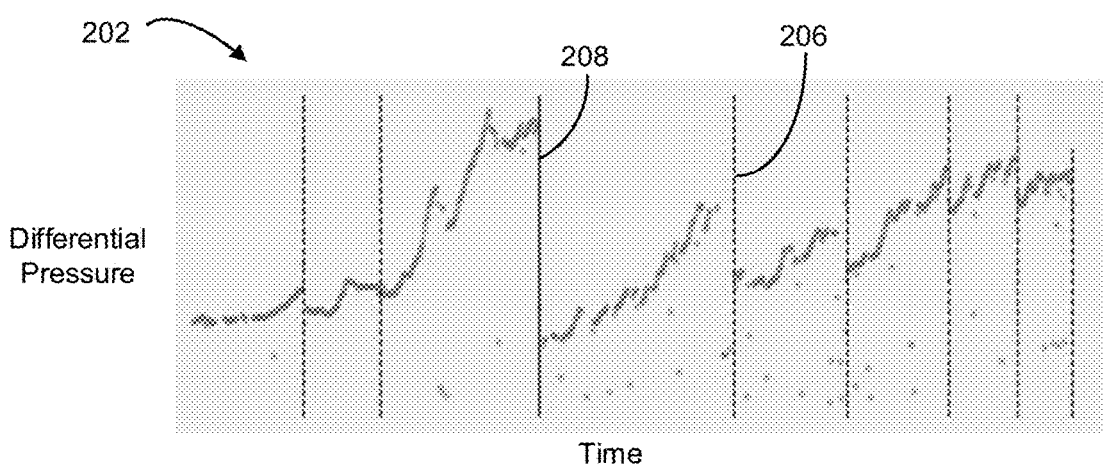
FIG. 2B is a graph illustrating exemplary differential pressure data for a water treatment plant, according to an embodiment.
Figure 2C:
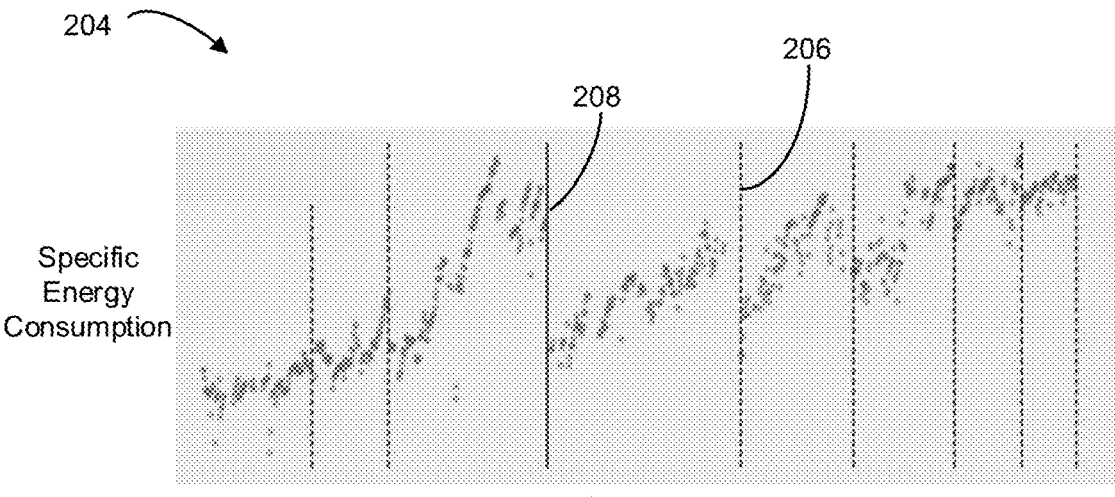
FIG. 2C is a graph illustrating exemplary specific energy consumption data for a water treatment plant, according to an embodiment.

Specific energy consumption (SEC) refers to the amount of energy consumed by the water treatment system 10 to produce one unit of output product (e.g., permeate water product). Graphs illustrating exemplary pressure (pressure graph 200), differential pressure (differential pressure graph 202), and specific energy consumption (specific energy consumption graph 204) data for the water treatment system 10 during a period of time are shown in FIGS. 2A-2C. Moreover, FIGS. 2A-2C show a correlation between pressure, differential pressure, and specific energy consumption for the water treatment system 10. For example, as the pressure required by the water treatment system 10 increases, so does the specific energy consumption for the water treatment system 10.

FIGS. 2A-2C also show a correlation between pressure, differential pressure, specific energy consumption, and the impact of maintenance processes such as clean-in-place (CIP) maintenance processes 206 and membrane replacement (MR) maintenance processes 208. CIP maintenance processes 206 comprise processes for cleaning equipment of the water treatment system 10. MR maintenance processes 208 comprise processes for replacing filtering membrane elements of the water treatment system 10. As shown in FIG. 2, performing maintenance processes such as the CIP maintenance processes 206, and MR maintenance processes 208 can reduce differential pressure, which in turn, reduces required pressure, and subsequently specific energy consumption for the water treatment system 10. For example, scaling and fouling of the water treatment system equipment caused by precipitate build-up can increase required pressure and specific energy consumption. Eliminating the build-up by performing maintenance processes enables the equipment to improve pressure efficiency and energy consumption efficiency. Accordingly, the present disclosure provides a framework for determining optimal times for scheduling maintenance processes and for executing the maintenance processes.

Figure 3:
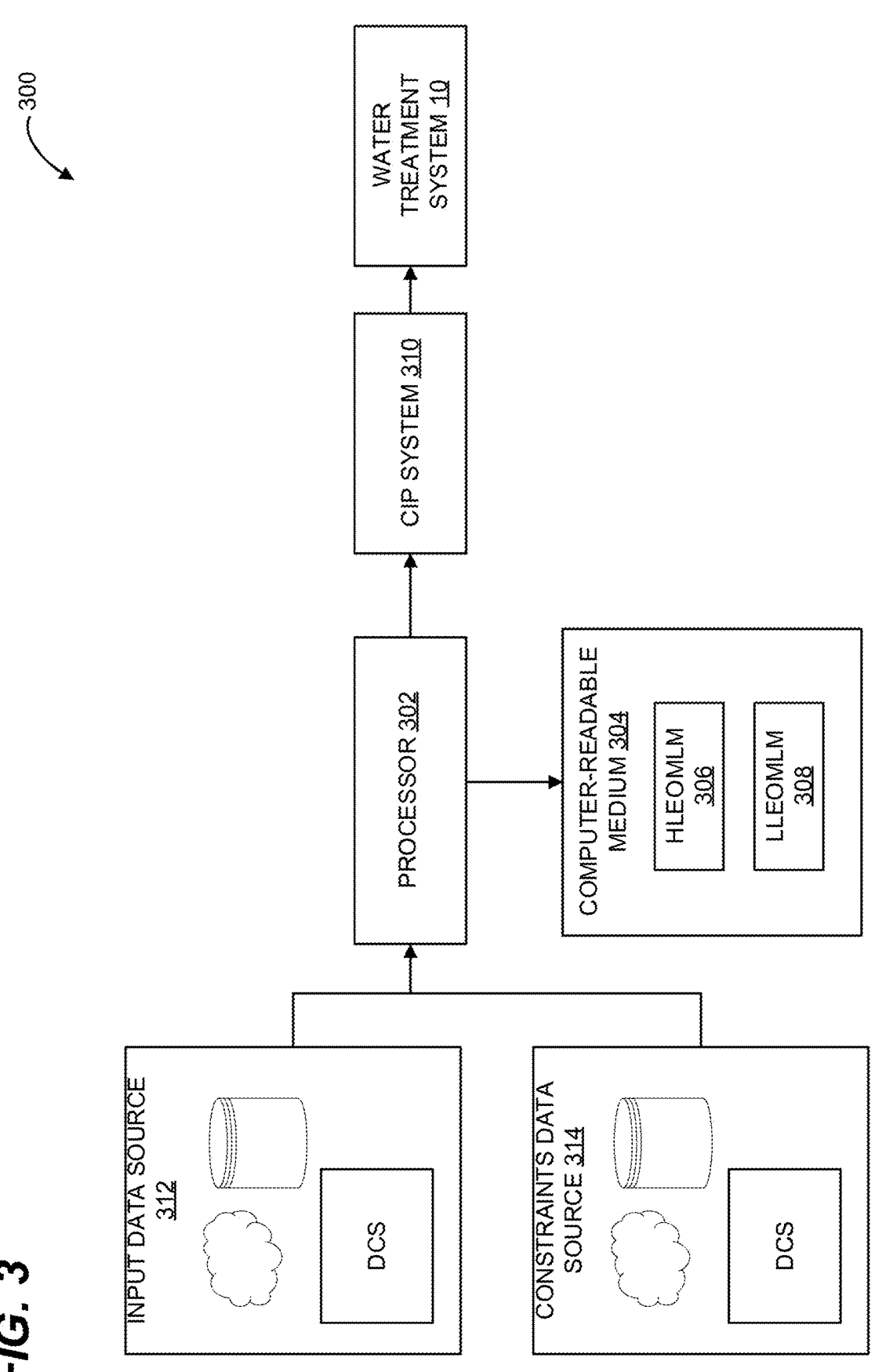
FIG. 3 is a schematic block diagram illustrating an energy management system for a water treatment plant, according to an embodiment.

Referring now to FIG. 3, a system for energy management in a water treatment plant is generally indicated at reference number 300. Broadly, the system 300 comprises at least one processor 302 coupled to at least one non-transitory computer-readable medium 304 hosting the HLEOMLM 306 and LLEOMLM 308, and a CIP system 310. In general, the processor 302 is configured to obtain input data from an input data source 312 for the water treatment plant, and constraints data from a constraints data source 314 for the water treatment plant. As explained below, the processor 302 executes at least one of the HLEOMLM 306 and LLEOMLM 308 to process the input and constraints data to provide as output at least one of a long-term maintenance schedule for the water treatment plant comprising one or more maintenance process performance times and a predicted corresponding energy consumption value calculated for each of the maintenance process performance times, and a current-maintenance schedule for the water treatment plant comprising one or more maintenance process performance times and a corresponding predicted operating cost value calculated for each of the maintenance process performance times. The CIP system 310 is operatively connected to the processor 302 for receiving the output from the processor and executing at least one of a CIP maintenance process and MR maintenance process in response to the output. The individual components of the system 300 will now be described in greater detail before turning to exemplary methods of using the system to optimally maintain a water treatment plant.

The input data source 312 is configured to store input data for the water treatment plant. In an exemplary embodiment, the input data source 312 comprises at least one of a distributed control system (DCS), a local database, and a cloud database configured to store input data including plant operating data for the water treatment plant. Some examples of plant operating data types include, but are not limited to, pressure data, differential pressure data, specific energy consumption data, production data, plant condition data, etc. The input data comprises at least one of actual plant operating data and forecasted plant operating data (e.g., Time Series forecasted data). The HLEOMLM 306 generally requires different types of plant operating data than the LLEOMLM 308. Plant operating data used in conjunction with the HLEOMLM 306 is referred to herein as HLEOMLM input data, whereas plant operating data used in conjunction with the LLEOMLM 308 is referred to herein as LLEOMLM input data. However, it is contemplated that there may be commonalities between the HLEOMLM input data and the LLEOMLM input data, with the main difference being the temporal extent of input data.

The constraints data source 314 is configured to store constraints data for the water treatment plant. In an exemplary embodiment, the constraints data source 314 comprises at least one of a distributed control system (DCS) 316, a local database, and a cloud database. It is contemplated that the input data source 312 and constraints data source 314 may be combined into a single data source that stores both the input and constraints data. Some examples of constraints data for the water treatment plant include, but are not limited to, production requirements, maintenance procedure requirements, safety requirements, energy consumption objectives, cost objectives, optimization period requirements, etc. The HLEOMLM 306 generally requires different types of constraints data than the LLEOMLM 308. Constraints data used in conjunction with the HLEOMLM 306 is referred to herein as HLEOMLM constraints data, whereas constraints data used in conjunction with the LLEOMLM 308 is referred to herein as LLEOMLM constraints data. However, it is contemplated that there may be commonalities between the HLEOMLM constraints data and the LLEOMLM constraints data. In one example, the HLEOMLM constraints data comprises at least a HLEOMLM optimization period requiring the HLEOMLM to operate based on the HLEOMLM optimization period. In an exemplary embodiment the HLEOMLM optimization period comprises a plurality of months and may be defined on a months and years timescale (e.g. six months, two years, etc.). In another example, the LLEOMLM constraints data comprises at least a LLEOMLM optimization period requiring the LLEOMLM to operate based on the LLEOMLM optimization period. In an exemplary embodiment the LLEOMLM optimization period comprises a days and weeks timescale (e.g., 1 week, 1 month, etc.). The HLEOMLM and LLEOMLM optimization periods also may indicate forecasting periods for the respective input data.

In general, the processor 302 is configured to execute the HLEOMLM 306 and the LLEOMLM 308 to obtain and process the input and constraints data to output the long-term and current maintenance schedules for the water treatment plant. Furthermore, the processor 302 is configured to provide the output to the CIP system 310 and to a display wherein plant operators may view the output. Suitably, the processor 302 is operatively connected to the non-transitory computer-readable medium 304 storing the HLEOMLM 306 and the LLEOMLM 308, input data source 312, constraints data source 314, and CIP system 310. Additionally, the processor 302 is operatively connected to the display of the water treatment plant. In an exemplary embodiment, a computer includes the processor 302, display, and other related elements. The computer may also include circuit boards and/or other electronic components such as a transceiver or external connection for connecting to other components of the system 300. For example, the computer includes components such as wireless transceivers and/or wired connectors that connect the computer to the computer-readable medium 304, input data source 312, constraints data source 314, and CIP system 310.

The HLEOMLM 306 is configured to minimize energy consumption for the water treatment plant. The HLEOMLM 306 comprises processor-executable instructions that, when executed by the processor 302, cause the system 300 to perform operations. The operations comprise: obtaining HLEOMLM input data, obtaining HLEOMLM constraints data, filtering the HLEOMLM for the HLEOMLM optimization period, and processing the HLEOMLM input data and HLEOMLM constraints data to provide as output, the long-term maintenance schedule that minimizes energy consumption for the water treatment plant during the HLEOMLM optimization period. The long-term maintenance schedule comprises one or more maintenance process performance times and a corresponding predicted energy consumption value calculated for each of the maintenance process performance times.

Figure 4:
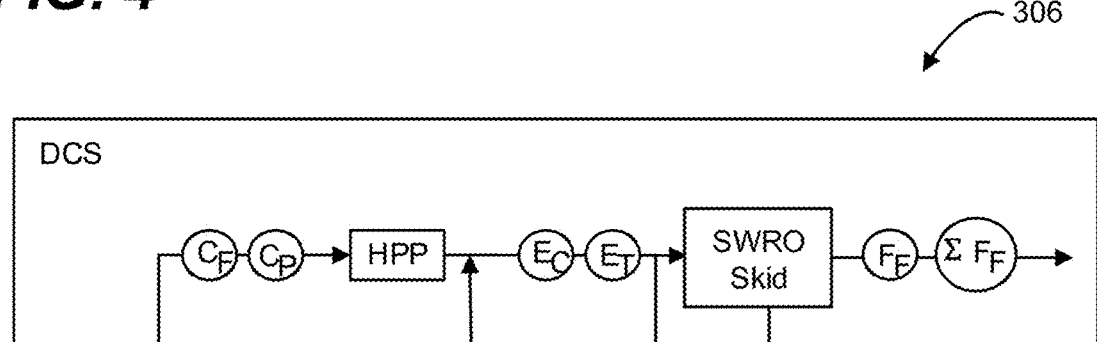
FIG. 4 is a schematic block diagram illustrating a high-level energy optimization machine-learned-model for a water treatment plant, according to an embodiment.
Figure 4:
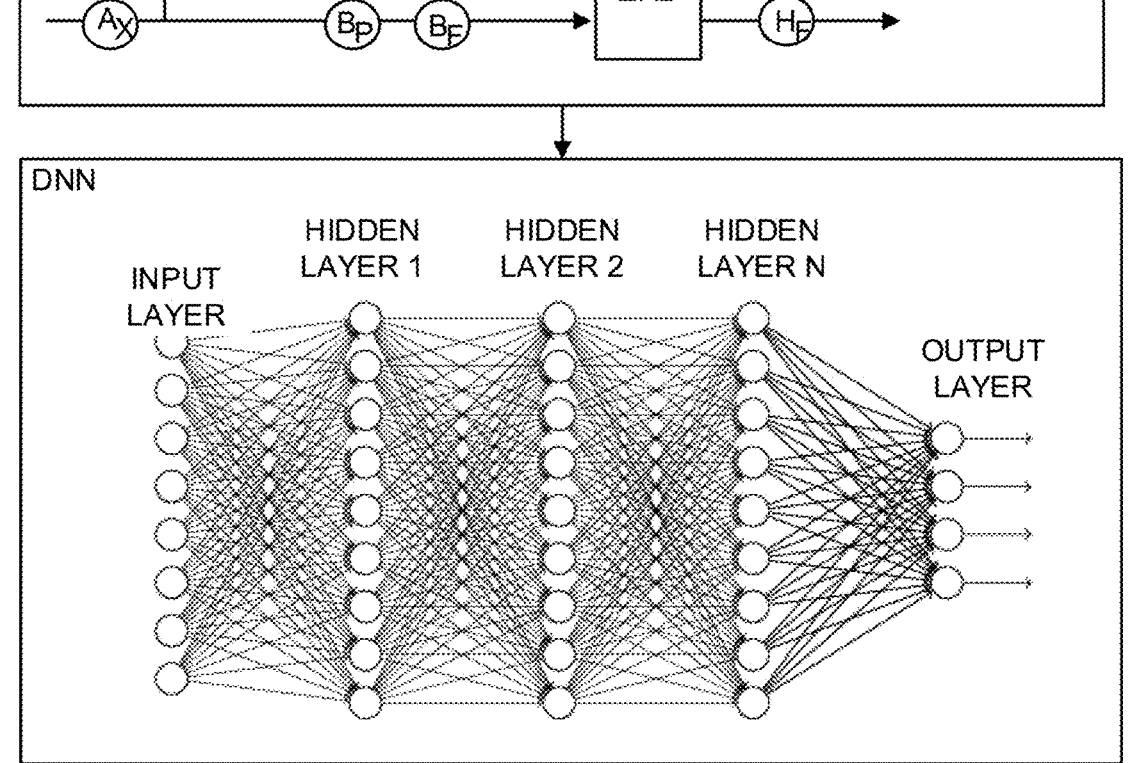

As briefly mentioned above, the HLEOMLM 306 causes the system 300 to obtain the HLEOMLM input and constraints data for the water treatment plant from the input data source 312 and constraints data source 314. In the illustrated embodiment of FIG. 4, the HLEOMLM input and constraints data is obtained from a DCS of the water treatment plant. In the exemplary embodiment of FIG. 4, the HLEOMLM input and constraints data comprises:

Lab data (AX): feed water electric conductivity (AEC), feed water total dissolved solids (ATDS), feed water turbidity (ATU), and feed water silt density index (ASDI).

Pressures: High-pressure pump inlet pressure (CP) and energy recovery device seawater inlet pressure (BP)

Flows: High pressure pump inlet flow rate (CF), energy recovery device seawater inlet flow rate (BF), outlet permeate flow rate (FF), outlet permeate cumulative volume ($\Sigma$FF), energy recovery device outlet concentrate flow rate (HF)

Recovery ratio

SWRO skid inlet temperature (ET) and conductivity (EC)

Additional features: days from last CIP or MR, days from last MR, percentage of replace membranes in the last MR, number of CIPs performed since last MR, number of MR performed to date, SEC right before and after performing the CIP/MR, mean SEC between two consecutive maintenance processes (CIP or MR), and the type of CIP performed In the illustrative embodiment, the HLEOMLM 306 comprises a deep neural network (DNN) including a plurality of input, hidden, and output layers for processing the input and constraints data. In one example, processing involves calculating a predicted original specific energy consumption for the water treatment plant using a Time Series specific energy consumption forecasting framework based on historical plant operating data and an original maintenance schedule configured for a HLEOMLM optimization period. The original maintenance schedule comprises one or more maintenance processes originally scheduled at the water treatment plant during the HLEOMLM optimization period. Furthermore, the processing involves iteratively calculating predicted specific energy consumption for the plant using the Time Series specific energy consumption forecasting framework based on different times for executing one or more maintenance processes. From here, the HLEOMLM 306 chooses the times that satisfy the constraints data and produce the lowest predicted specific energy consumption for the water treatment plant to determine the long-term maintenance schedule. The HLEOMLM 306 is also configured to compare the chosen lowest predicted specific energy consumption to the predicted original specific energy consumption to determine energy savings for the water treatment plant.

Figure 5:
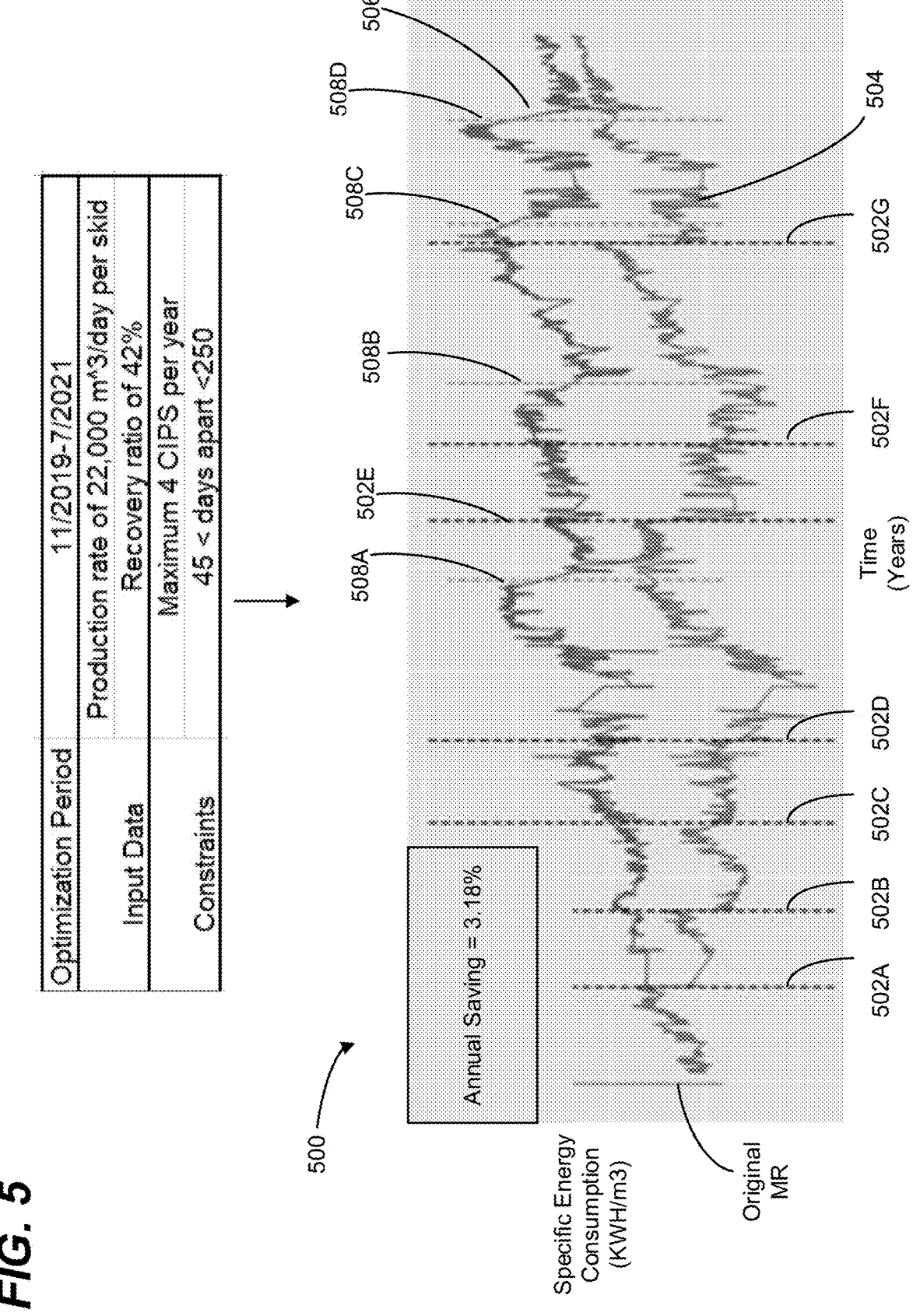
FIG. 5 is an illustration of an example operation of a high-level energy optimization machine-learned model for a water treatment plant, according to an embodiment.

Referring now to FIG. 5, an example of the operation of the HLEOMLM 306 is provided. The HLEOMLM input data includes a production rate of 22,000 m^3/day per water treatment system 10, and a recovery ratio of 42%. The HLEOMLM constraints data includes a HLEOMLM optimization period from November of 2019 to July of 2021, a requirement that at most four CIP maintenance processes may be performed each year, and a requirement that the CIP maintenance processes are scheduled at least 45 days apart and at most 250 days apart. This data is obtained from the input data source 312 and constraints data source 314. The HLEOMLM input and constraints data is processed using the HLEOMLM 306 to output a long-term maintenance schedule 500 that minimizes the predicted specific energy consumption for the water treatment plant during the HLEOMLM optimization period. The long-term maintenance schedule 500 comprises a plurality of optimal CIP maintenance process times 502A-502G that satisfy the constraints data and optimize predicted specific energy consumption for the water treatment plant. Moreover, the long-term maintenance schedule 500 shows an optimized prediction 504 of the predicted specific energy consumption for the water treatment plant based on performing the CIP maintenance processes at the optimal CIP maintenance process times 502A-502G. The optimized prediction 504 is compared against a prediction 506 of the specific energy consumption for the water treatment plant based on performing CIP maintenance processes at original CIP maintenance process times 508A-508D. Thus, the water treatment plant in this example, achieves an annual energy savings of 3.18% using the long-term maintenance schedule outputted by the HLEOMLM 306 instead of an original maintenance schedule comprising the original non-optimized CIP maintenance process times 508A-508D.

In one embodiment, the HLEOMLM 306 is trained using a genetic algorithm (GA) optimization technique. The GA algorithm is an iterative algorithm that aims at finding the best maintenance schedule, comprised of CIP dates, that maximizes a "fitness" function. In the current context, the fitness function can be defined as the SEC saving relative to a baseline value (for example, the historic SEC measured at the plant). In each iteration, an initial population of maintenance schedule is selected randomly, and the corresponding fitness values are estimated. Next, the top best set of maintenance schedule in terms of fitness value is selected from the initial population and are used to generate new set of schedules through a process called crossover. Finally, randomness is added in the mutation step and the resulting set of maintenance schedules is used as the initial population for the subsequent iteration. This process is repeated until the improvement to the fitness values is negligible, and then, the maintenance schedule associated with the top fitness value is selected as the optimum schedule.

The computer-readable medium 304 is configured to store the HLEOMLM 306, the LLEOMLM 308, and processor-executable model adapting instructions for retraining the HLEOMLM and the LLEOMLM. The model adapting instructions account for natural system degradation over time and are used to combat a loss of accuracy in the HLEOMLM 306 and LLEOMLM 308, as well as obsolescence of the HLEOMLM and LLEOMLM. In one example of retraining the HLEOMLM 306, the model adapting instructions, when executed by the processor 302, cause the system 300 to obtain a comparison value for each predicted energy consumption value of the long-term maintenance schedule, calculate a deviation between each comparison value and the respective energy consumption value, determine if any assignable cause exists for each deviation, and re-train the HLEOMLM based on each deviation not having an assignable cause. Each comparison value comprises an actual energy consumption value determined for the water treatment plant based on the execution of the optimal maintenance process times.

The LLEOMLM 308 is configured to minimize operating cost for the water treatment plant. The LLEOMLM 308 comprises processor-executable instructions that, when executed by the processor 302, cause the system 300 to perform operations. The operations comprise: obtaining LLEOMLM input data and obtaining LLEOMLM constraints data from the input data source 312 and constraints data source 314. Furthermore, the operations comprise filtering the LLEOMLM for the LLEOMLM optimization period, and processing the LLEOMLM input data and LLEOMLM constraints data to provide as output, the current maintenance schedule that minimizes operating cost for the water treatment plant during the LLEOMLM optimization period. Furthermore, the current maintenance schedule is configured to maximize a lifespan of equipment used at the water treatment plant such as one or more membrane elements. The current maintenance schedule comprises one or more maintenance process performance times and a corresponding predicted operating cost value calculated for each of the maintenance process performance times.

Figure 6:
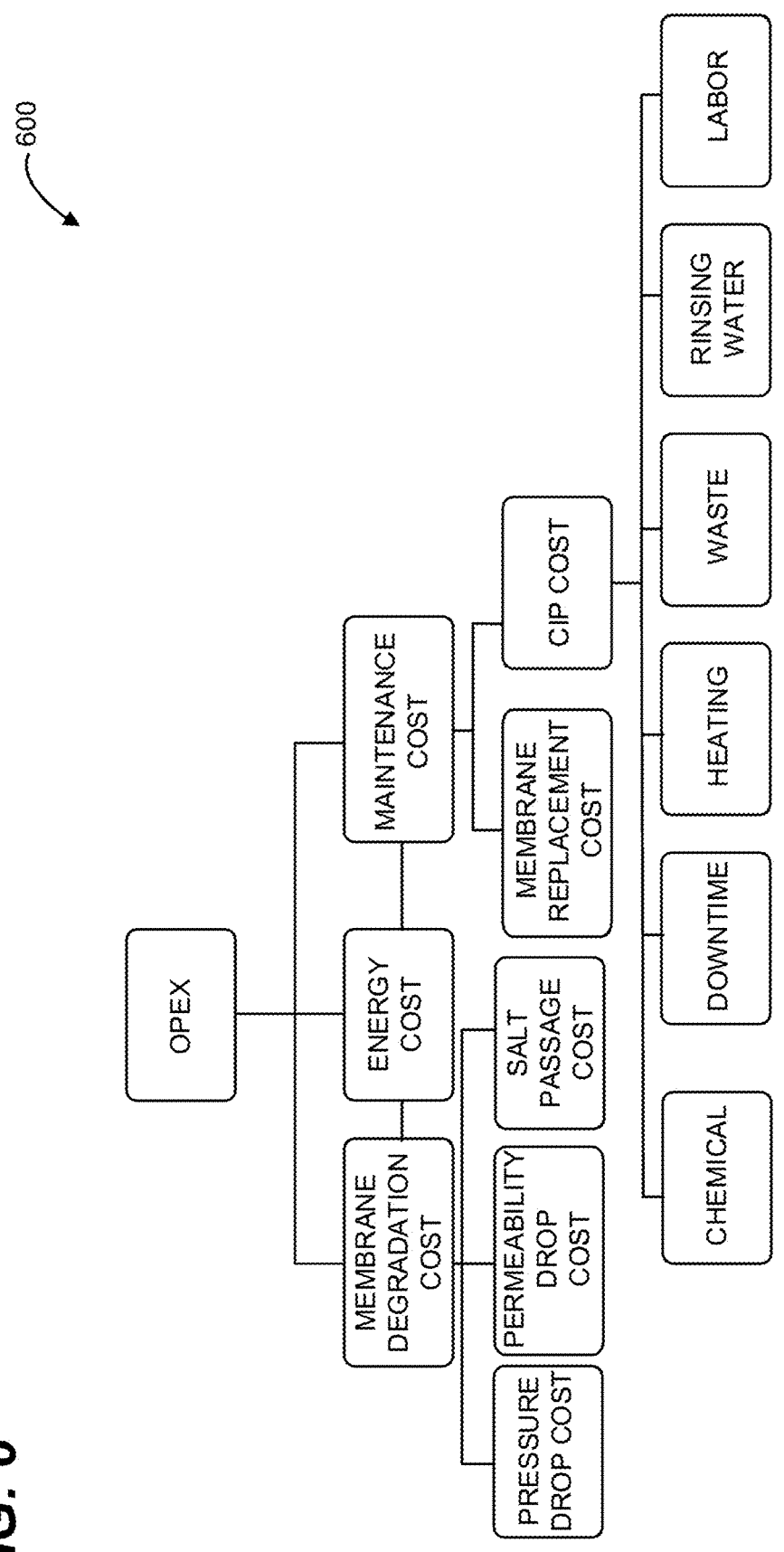
FIG. 6 is an illustration of an example operating cost formulation for a low-level energy optimization machine-learned model for a water treatment plant, according to an embodiment.

In FIG. 6, an exemplary embodiment of operating cost formulation for a water treatment plant is generally indicated at reference number 600. At a high-level, factors contributing to the operating cost as concerned by the LLEOMLM 308, include membrane degradation cost, energy cost, and maintenance cost. As briefly explained above, the LLEOMLM 308 processes the LLEOMLM input and constraints data to determine a current maintenance schedule that minimizes operating cost for the water treatment plant during the LLEOMLM optimization period. The LLEOMLM 308 in one example, achieves this by determining one or more maintenance procedure times in which the sum of the membrane degradation cost and energy cost at least one of meets and exceeds the maintenance cost. One of ordinary skill in the art is familiar with various formulas for calculating costs for seawater RO processes. The LLEOMLM input data used to calculate such costs comprises at least one of actual plant operating data and short-term forecasted plant operating data (e.g., Time Series forecasted plant operating data).

Figure 7:
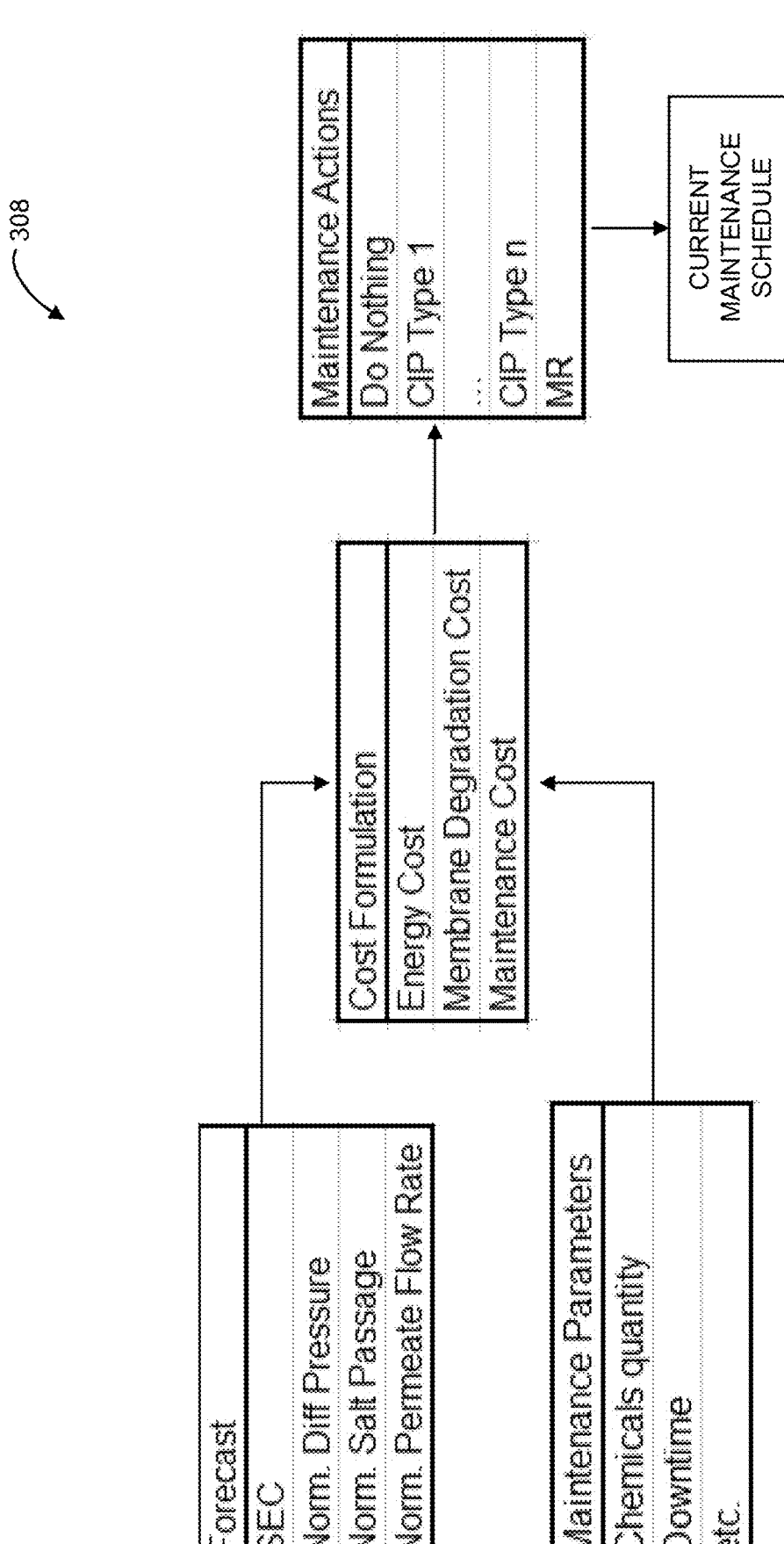
FIG. 7 is an illustration of an example operation of a low-level energy optimization machine-learned model for a water treatment plant, according to an embodiment.

Referring now to FIG. 7, an example of the operation of the LLEOMLM 308 is provided. The LLEOMLM input data includes forecasted plant operating data including specific energy consumption, normal differential pressure, normal salt passage, and normal permeate flow rate data for the water treatment plant. In one example, the differential pressure is forecasted using a differential pressure forecasting model that includes a Temporal Fusion Transformer Probabilistic Time Series forecasting model. The LLEOMLM constraints data includes an LLEOMLM optimization period and maintenance requirements including chemical requirements and downtime requirements. This data is obtained from the input data source 312 and constraints data source 314. The LLEOMLM input and constraints data is processed using the LLEOMLM 308 to output a current maintenance schedule that minimizes operating costs for the water treatment plant during the LLEOMLM optimization period. The current maintenance schedule comprises one or more maintenance process performance times and a corresponding predicted operating cost value calculated for each of the maintenance process performance times that satisfy the constraints data and optimize operating cost for the water treatment plant. In an exemplary embodiment, the LLEOMLM input and constraints data is processed using the LLEOMLM 308 to output the current maintenance schedule to further comprise an optimal type of maintenance process (e.g., a particular type of a CIP maintenance process, a MR maintenance process, etc.) for each of the maintenance process performance times.

As mentioned above, the computer-readable medium 304 is configured to store the HLEOMLM 306, the LLEOMLM 308, and processor-executable model adapting instructions for retraining the HLEOMLM and the LLEOMLM. In one example of retraining the LLEOMLM 308, the model adapting instructions, when executed by the processor 302, cause the system 300 to obtain a comparison value for each predicted operating cost value of the current maintenance schedule, calculate a deviation between each comparison value and the respective predicted operating cost value, determine if any assignable cause exists for each deviation, and re-train the LLEOMLM based on each deviation not having an assignable cause. Each comparison value comprises an actual operating cost value determined for the water treatment plant based on the execution of the optimal maintenance process times.

The CIP system 310 comprises a system within the water treatment plant that is configured to execute a maintenance process (e.g., a CIP maintenance process, MR maintenance process, etc.) on equipment of the water treatment plant based on outputs from at least one of the HLEOMLM 306 and LLEOMLM 308. Accordingly, the CIP system 310 is operably connected to the processor 302 to receive the outputs from the processor. The CIP system 310 may also be operably connected to a display for displaying at least one of the outputs and the maintenance processes will be and/or are being executed by the CIP system 310 to plant operators.

A computer-implemented method for using the system 300 to maintain the water treatment plant and water treatment systems 10 thereof will now be described.

First input and constraints data for the water treatment plant is obtained from the input data source 312 and constraints data source 314 by the processor 302. The input data comprises at least plant operating data for the water treatment plant. The constraints data indicates at least one or more optimization periods, an energy consumption objective, and a cost objective. The processor 302 then executes processor-executable instructions that cause the system 300 to pre-process the input and constraints data. In this, the input data and constraints data is filtered based on one or more optimization periods and classified as at least one of HLEOMLM input data, HLEOMLM constraints data, LLEOMLM input data, and LLEOMLM constraints data.

From here, the instructions cause the system 300 to determine whether to execute at least one of the HLEOMLM 306 and LLEOMLM 308 based on at least one of the input data and constraints data.

Next, the system 300 executes at least one of the HLEOMLM 306 and the LLEOMLM 308 in response to the determining. Executing the HLEOMLM 306 comprises processing the input data and constraints data to provide as output, the long-term maintenance schedule configured to minimize energy consumption for the water treatment plant. The long-term maintenance schedule comprises one or more maintenance process performance times and a corresponding predicted energy consumption value calculated for each of the maintenance process performance times. Executing the LLEOMLM 308 comprises processing the input data and constraints data to provide as output, the current maintenance schedule configured to minimize operating cost for the water treatment plant. The current maintenance schedule comprises one or more maintenance process performance times and a corresponding predicted operating cost value calculated for each of the maintenance process performance times. From here, the CIP system 310 obtains the output(s) from the processor 302, and executes one or more maintenance processes responsive to the output of at least one of the HLEOMLM 306 and the LLEOMLM 308 for maintaining the water treatment plant.

An exemplary method of using the HLEOMLM 306 to maintain the water treatment plant and water treatment systems 10 thereof will now be described. First an optimization period is determined. In one example, the optimization period comprises a HLEOMLM optimization period of two years. Next, values for the input data and constraints data for the HLEOMLM 306 are chosen. For example, these values are chosen based on a control philosophy for the water treatment plant. From here, the HLEOMLM 306 is executed to obtain optimal CIP performance dates that minimize specific energy consumption for the water treatment plant.

An exemplary method of using the LLEOMLM 308 to maintain the water treatment plant and water treatment systems 10 thereof will now be described. First an optimization period is determined. The optimization period indicates a forecasting period for the LLEOMLM 308. In one example, the optimization period comprises a LLEOMLM optimization period of 1 month. Next, values for the input data and constraints data for the LLEOMLM 308 are chosen. For example, these values are chosen based on a control philosophy for the water treatment plant. Moreover, the constraints data for the LLEOMLM 308 may be determined based on maintenance protocols for the water treatment plant. From here, the LLEOMLM 308 is executed to provide recommendations for a type of maintenance process to be performed and date range up to one month in advance.

Exemplary maintenance protocols for a water treatment plant include but are not limited to:
1.) Alkaline cleaning (circulation (9 m3/h) with NaOH with, pH 12, 0.01 M, 35° C., 1 h)
2.) Alkaline cleaning (soaking with NaOH, pH 12, 0.01 M, 35° C., 30 min)
3.) Repeat the alkaline cleaning cycle 2 more times
4.) Rinsing with demineralized water
5.) Acid cleaning (circulation (9 m3/h) with HCl, pH 2.1, 35° C., 1 h)
6.) Acid cleaning (soaking with HCl, pH 2.1, 35° C., 30 min)
7.) Repeat the acid cleaning cycle 2 more times
8.) Final rinsing with demineralized water In an exemplary embodiment, an AI-based maintenance planning system for reverse osmosis desalination plants includes the HLEOMLM and the LLEOMLM. The HLEOMLM is configured to receive production plan and control set points as input data. Responsive to the input data, the HLEOMLM is configured to plan optimal timing of performing maintenance procedures at the reverse osmosis desalination plants for the next few months, or years, given the planned production, control set points, and operational constraints to minimize specific energy consumption of the desalination process. The LLEOMLM is configured to receive current and most recent production and plant condition data as input data. Responsive to the input data, the LLEOMLM is configured to adjust a maintenance plan for the reverse osmosis desalination plant based on the current production status and plant condition to minimize the specific energy consumption of the desalination process and to extend the useful life of machines. In one example, the LLEOMLM is configured to work at a timescale of days and weeks.

Embodiments of the present disclosure comprise a special purpose computer including a variety of computer hardware, as described in greater detail herein and are operational with other special purpose computing system environments or configurations even if described in connection with an example computing system environment. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices. For purposes of illustration, programs and other executable program components may be shown as discrete blocks. It is recognized, however, that such programs and components reside at various times in different storage components of a computing device, and are executed by a data processor(s) of the device.

In operation, processors, computers, and/or servers may execute the processor-executable instructions (e.g., software, firmware, and/or hardware) such as those illustrated herein to implement aspects of the invention. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the present disclosure.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A system for energy management in a water treatment plant, the system comprising:
    at least one processor;
    at least one non-transitory computer-readable medium coupled to the processor, the computer-readable medium storing:
        a high-level energy optimization machine-learned model (HLEOMLM) comprising processor-executable instructions that, when executed by the processor, cause the system to perform operations, the operations comprising:

obtaining HLEOMLM input data from an industrial control system associated with the water treatment plant, the HLEOMLM input data comprising plant operating data for the water treatment plant;

obtaining HLEOMLM constraints data for the water treatment plant from the industrial control system; and processing the HLEOMLM input data and HLEOMLM constraints data to provide as output, a long-term maintenance schedule configured to minimize energy consumption for the water treatment plant during a HLEOMLM optimization period, the long-term maintenance schedule comprising one or more maintenance process performance times and a corresponding predicted energy consumption value calculated for each of the maintenance process performance times; and a clean-in-place (CIP) system configured to execute a CIP maintenance process on equipment of the water treatment plant responsive to the output of the HLEOMLM for maintaining the water treatment plant.

2. The system of claim 1, wherein the HLEOMLM optimization period comprises a plurality of months.

3. The system of claim 1, wherein said operations further comprising filtering the HLEOMLM input data for the HLEOMLM optimization period.

4. The system of claim 1, wherein the HLEOMLM constraints data comprises at least one of production requirements for the water treatment plant and maintenance procedure requirements for the water treatment plant.

5. The system of claim 1, wherein the computer-readable medium stores processor-executable model adapting instructions that, when executed by the processor, further cause the system to obtain a comparison value for each predicted energy consumption value, calculate a deviation between each comparison value and respective predicted energy consumption value, and re-train the HLEOMLM based on one or more of the deviations.

6. The system of claim 1, further comprising a distributed control system comprising the plant operating data.

7. The system of claim 1, wherein the clean-in-place (CIP) system is further configured to execute a membrane replacement (MR) maintenance process responsive to the output of the HLEOMLM for maintaining the water treatment plant.

8. The system of claim 1, wherein the computer-readable medium stores a low-level energy optimization machine-learned model (LLEOMLM) comprising processor executable instructions that, when executed by the processor, further cause the system to perform operations, the operations comprising:

obtaining LLEOMLM input data, the LLEOMLM input data comprising plant operating data for the water treatment plant;

obtaining LLEOMLM constraints data for the water treatment plant;

processing the LLEOMLM input data and LLEOMLM constraints data to provide as output, a current maintenance schedule configured to minimize operating cost for the water treatment plant during a LLEOMLM optimization period, the current maintenance schedule comprising one or more maintenance process performance times and a corresponding predicted operating cost value calculated for each of the maintenance process performance times, wherein the CIP system is further configured to execute the CIP maintenance process responsive to the output of the LLEOMLM for maintaining the water treatment plant.

9. A system for energy management in a water treatment plant, the system comprising:

at least one processor;

at least one non-transitory computer-readable medium coupled to the processor, the computer-readable medium storing:

a low-level energy optimization machine-learned model (LLEOMLM) comprising processor-executable instructions that when executed by the processor, cause the system to perform operations, the operations comprising:

obtaining LLEOMLM input data from an industrial control system associated with the water treatment plant, the LLEOMLM input data comprising plant operating data for the water treatment plant;

obtaining LLEOMLM constraints data for the water treatment plant from the industrial control system; and processing the LLEOMLM input data and LLEOMLM constraints data to provide as output, a current maintenance schedule configured to minimize operating cost for the water treatment plant during a LLEOMLM optimization period, the current maintenance schedule comprising one or more maintenance process performance times and a corresponding predicted operating cost value calculated for each of the maintenance process performance times; and a clean-in-place (CIP) system configured to execute a CIP maintenance process on equipment of the water treatment plant responsive to the output of the LLEOMLM for maintaining the water treatment plant.

10. The system of claim 9, wherein the LLEOMLM optimization period comprises at least one day.

11. The system of claim 9, wherein the current maintenance schedule is further configured to maximize a lifespan of one or more membrane elements used at the water treatment plant.

12. The system of claim 9, wherein said operations further comprising filtering the LLEOMLM input data for the LLEOMLM optimization period.

13. The system of claim 9, wherein the LLEOMLM constraints data comprises at least one of production requirements for the water treatment plant and maintenance procedure requirements for the water treatment plant.

14. The system of claim 9, wherein the plant operating data comprises at least forecasted data.

15. The system of claim 9, wherein the computer-readable medium stores processor-executable model adapting instructions that, when executed by the processor, cause the system to obtain a comparison value for each predicted operating cost value, calculate a deviation between each comparison value and respective predicted operating cost value, and re-train the LLEOMLM based on one or more of the deviations.

16. The system of claim 9, wherein the clean-in-place (CIP) system is further configured to execute a membrane replacement (MR) maintenance process responsive to the output of the LLEOMLM for maintaining the water treatment plant.

17. The system of claim 9, wherein the operating cost for the water treatment plant comprises membrane degradation cost, energy cost, and maintenance cost, and wherein the one or more maintenance procedure times comprise those times in which the sum of the membrane degradation cost and energy cost at least one of meets and exceeds the maintenance cost.

18. A computer-implemented method for maintaining a water treatment plant, the method comprising:

receiving input data from an industrial control system associated with the water treatment plant, the input data comprising plant operating data for the water treatment plant;

receiving constraints data for the water treatment plant from the industrial control system, the constraints data indicating at least one or more optimization periods, an energy consumption objective, and a cost objective;

determining whether to execute at least one of a high-level energy optimization machine-learned model (HLEOMLM) and a low-level energy optimization machine-learned model (LLEOMLM) based on at least one of the input data and constraints data;

executing at least one of the HLEOMLM and the LLEOMLM in response to the determining, wherein executing the HLEOMLM comprises processing the input data and constraints data to provide as output, a long-term maintenance schedule configured to minimize energy consumption for the water treatment plant, the long-term maintenance schedule comprising one or more maintenance process performance times and a corresponding predicted energy consumption value calculated for each of the maintenance process performance times, and wherein executing the LLEOMLM comprises processing the input data and constraints data to provide as output, a current maintenance schedule configured to minimize operating cost for the water treatment plant, the current maintenance schedule comprising one or more maintenance process performance times and a corresponding predicted operating cost value calculated for each of the maintenance process performance times; and executing at a clean-in-place (CIP) system, a CIP maintenance process on equipment of the water treatment plant responsive to the output of at least one of the HLEOMLM and the LLEOMLM for maintaining the water treatment plant.

19. The computer-implemented method of claim 18, further comprising at least one of filtering the input data based on one or more optimization periods and classifying the input data as at least one of HLEOMLM input data and LLEOMLM input data to pre-process the input data.

20. The computer-implemented method of claim 18, further comprising classifying the constraints data as at least one of HLEOMLM constraints data and LLEOMLM constraints data to pre-process the constraints data.

* * * * *